Patented Dec. 22, 1953

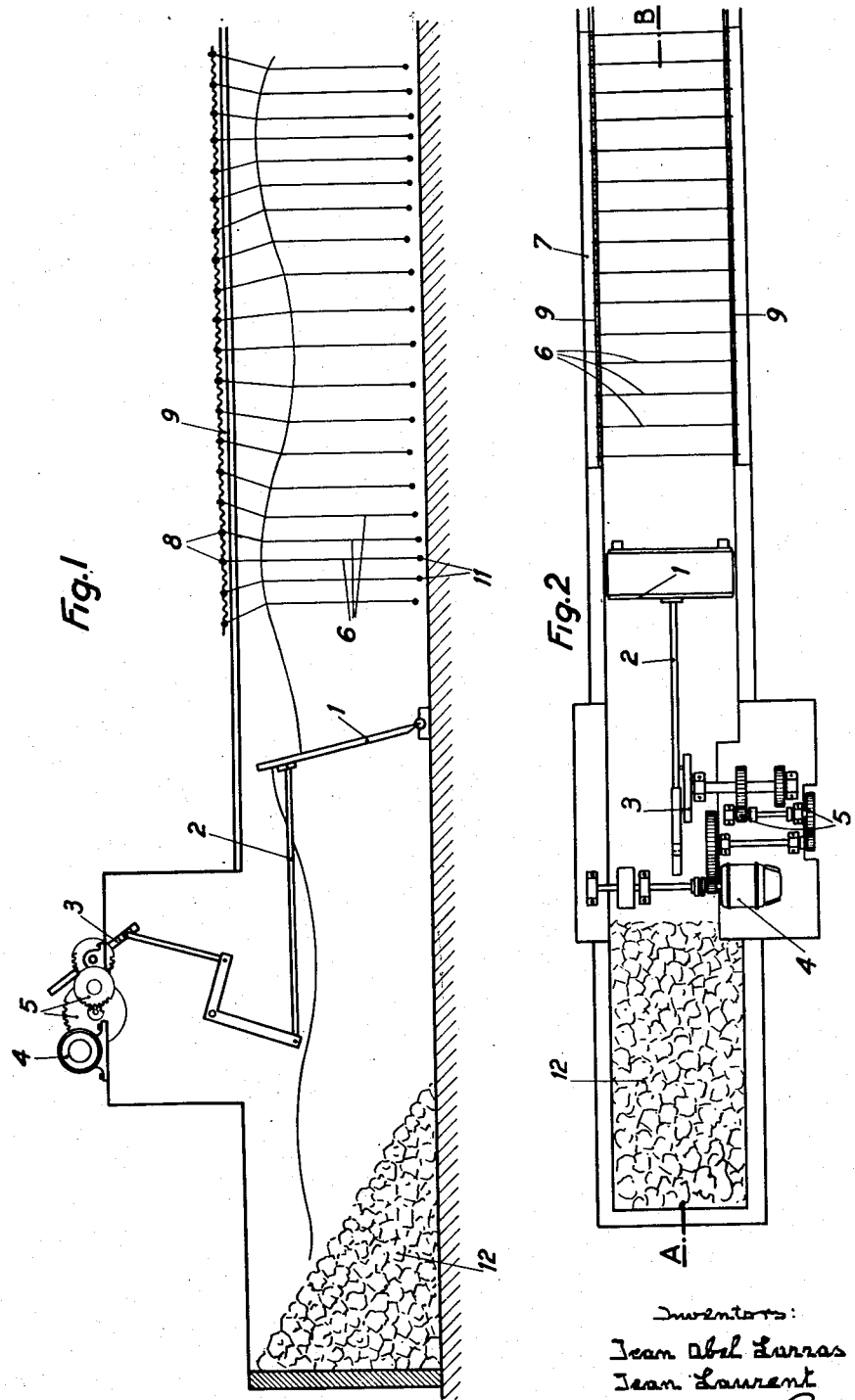

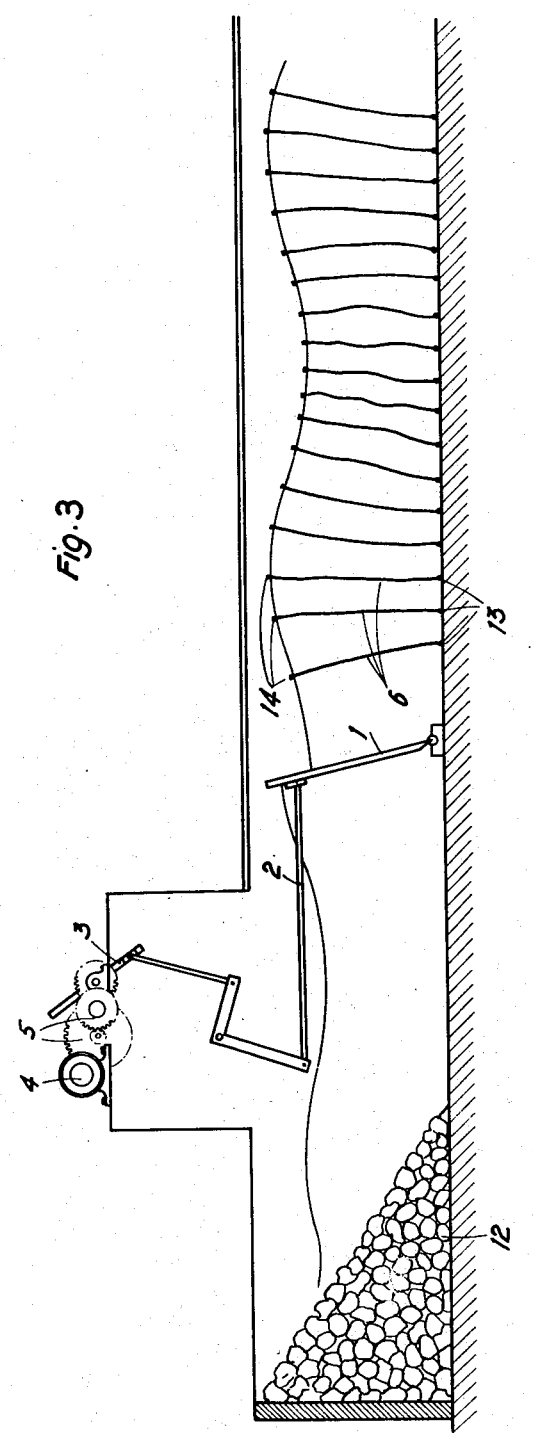

2,663,092

UNITED STATES PATENT OFFICE 2,663,092

SURGE GENERATING APPARATUS

Jean Laurent, Maisons-Alfort, France, and Jean Abel Larras, Algier, Algerie

Application January 4, 1951, Serial No. 204,316

Claims priority, application France January 6, 1950

5 Claims. (Cl. 35—19)

Our invention relates to laboratory apparatus for generating and controlling surges in reduced models of flumes or other water channels provided with a wave generator at or near one end thereof.

In laboratory research work involving a reduced reproduction of the surge it is important not only to obtain the clearest possible surge but also to prevent the waves from being reflected back to the wave generator. For this purpose it has already been suggested to arrange in front of the wave generator systems termed "cleaners" or "filters" which consisted for example of a series of rigid vertical plates parallel to one another and to the direction of propagation of the surge.

The object of the present invention is to improve the known laboratory apparatus of the type indicated above and particularly to insure in such apparatus the generation of a clear surge undisturbed by secondary wave motions. Our new apparatus comprises in addition to the customary wave generator in the water channel a plurality of screens or curtains made of a pliable material and arranged in spaced relation in front of said wave generator, each curtain extending freely across the channel and being held in place and in essentially vertical position by retaining means attached to one cross-channel edge thereof and by weighting or floating means, respectively, attached to the other cross-channel edge.

The said pliable screens or curtains will coordinate the wave motion of the liquid body crudely produced by the wave generator so that pure waves will arise in the water channel and reflected waves will be prevented from returning to the wave generator.

The said and other objects of our invention will be more fully understood from the following specification when read with the accompanying drawing in which two embodiments are illustrated.

In the drawing

Fig. 1 shows an elevational sectional view of our new apparatus along line A—B in Fig. 2, Fig. 2 is a plan view thereof, and Fig. 3 shows an elevational sectional view of a modified embodiment thereof.

The same reference numbers indicate the same or equivalent parts of the apparatus in all figures of the drawing.

Our new apparatus comprises a longitudinal walled in flume or water channel 7 including a customary wave generator consisting of a rigid or flexible shutter 1 which oscillates about its lower edge and is reciprocated by a driving rod 2 actuated through an intermediate adjustable linkage by means of an eccentric 3 driven by a motor 4 and a reduction gear 5. The reciprocational speed of the shutter 1 may be controlled by modifying the rotational speed of the motor 4 and the camber of the waves may be controlled by varying the size of the oscillation angle of the shutter 1.

According to our invention we place in front of the wave generator 1 a series of spaced pliable members such as screens or curtains which may be made of canvas or any other suitable material and are held in a position essentially perpendicular to the plane of symmetry of the water channel 7.

As shown in Figs. 1 and 2 each curtain is suspended from a cross bar 8 which rests with its ends in notches of longitudinal bars 9 placed on both sides of the channel 7 above the water level in the channel. Weighting means such as a rigid cross bar 11 of appropriate weight are attached to the lower cross-channel edge of each curtain to hold the same in essentially vertical position in the water filled channel.

As the spacing and the number of curtains 6 influences the characteristics of the surge to be generated, both should be changeable at will.

Instead of the arrangement shown in Figs. 1 and 2 and described before, the lower cross-channel edge of each flexible member 6 may be attached to the bottom of the channel 7 and its upper cross-channel edge maintained in place by floats 14 or by other convenient means as shown in Fig. 3.

It will be well understood that the wave motion generated by the shutter 1 will be successively imparted to the consecutive flexible members 6 of which the most forward one will actually act as genuine wave generator while the various portions of water between consecutive flexible members 6 will undergo a successive dephasing.

It is advisable to provide in the channel tail a wave absorber 12, which may consist of pebbles or fragments of an appropriate solid material piled up slopingly in order to prevent the propagation of a surge toward the channel tail.

While specific embodiments of our invention have been shown and described in detail to illustrate the application of the principles of our invention, it will be understood that the same may be otherwise embodied without departing from said principles.

What we claim as our invention is:

1. In a laboratory apparatus for generating and controlling surges in a flume or other water channel including a reciprocable agitating member at one end of the channel to generate water waves lengthwise therein and driving means for said reciprocable member, the improvement comprising a plurality of screens or curtains made of a pliable material and arranged in spaced relation in front of said reciprocable member, each screen or curtain freely extending across said channel to participate in the wave motion; and retaining means attached to one cross-channel edge of each screen or curtain to hold the same in place within said channel and means attached to the other cross-channel edge of each screen or curtain to hold the same in essentially vertical position in the water-filled channel.

2. In a laboratory apparatus for generating and controlling surges in a flume or other water channel including a reciprocable agitating member at one end of the channel to generate water waves lengthwise therein and driving means for said reciprocable member, the improvement comprising a plurality of screens or curtains made of a pliable material; each curtain extending across said channel; suspending means attached to the upper edges of said screen or curtains to hold the same in free hanging positions in spaced relation in front of said reciprocable member; and weighting means attached to the lower edge of each screen or curtain.

3. In a laboratory apparatus for generating and controlling surges in a flume or other water channel including a reciprocable agitating member at one end of the channel to generate water waves lengthwise therein and driving means for said reciprocable member, the improvement comprising a plurality of screens or curtains made of a pliable material; each screen or curtain extending across said channel; cross bars mounted transversely to the channel and attached to the upper edges of said screens or curtains to hold the same in free hanging positions in spaced relation in front of said reciprocable member; and weighting means attached to the lower edge of each screen or curtain.

4. In a laboratory apparatus for generating and controlling surges in a flume or other water channel including a reciprocable agitating member at one end of the channel to generate water waves lengthwise therein and driving means for said reciprocable member, the improvement comprising a plurality of screens or curtains made of a pliable material; each screen or curtain extending across said channel; holding means attached to the lower edges of said screens or curtains to secure the same at least near the bottom of said channel; and floating means attached to the upper edge of each screen or curtain to hold the same in upstanding position.

5. A laboratory apparatus according to claim 1 wherein said curtains are mounted in adjustably spaced relation.

JEAN LAURENT.
JEAN ABEL LARRAS.

References Cited in the file of this patent

UNITED STATES PATENTS

| Number | Name | Date |
| --- | --- | --- |
| 858,103 | Place | June 25, 1907 |
| 2,523,165 | Tice | Sept. 19, 1950 |
| 2,536,943 | Kessel | Jan. 2, 1951 |

FOREIGN PATENTS

| Number | Country | Date |
| --- | --- | --- |
| 46,608 | Switzerland | Feb. 26, 1909 |

OTHER REFERENCES

"Hydraulics Lab. Practice" by J. R. Freeman; published by the American Society of Mechanical Engineers; 29 West 39th St., New York city; 1929; pages 522–529.

"An Experimental Study of Submarine Sand Bars," Technical Report #3; published by Beach Erosion Board, Office of Chief of Engineers, Corps of Engineers, U. S. Army, August 1948; pages 5–7 including Fig. 2 on page 6.

"Lab. Control of Ocean Waves" by F. J. Sines; published in "Engineering News Record" of December 1948; vol. 141, No. 24; see pages 96, 97.

"Reflection of Solitary Waves," Technical Memorandum No. 11; published by Beach Erosion Board, Corps of Engineers, Dept. of the Army; November 1949; see page 6 and plate No. 2.